Sept. 4, 1923.
C. W. TRACY
1,466,976
PULLER FOR SLEEVE BEARINGS
Filed Jan. 10, 1922
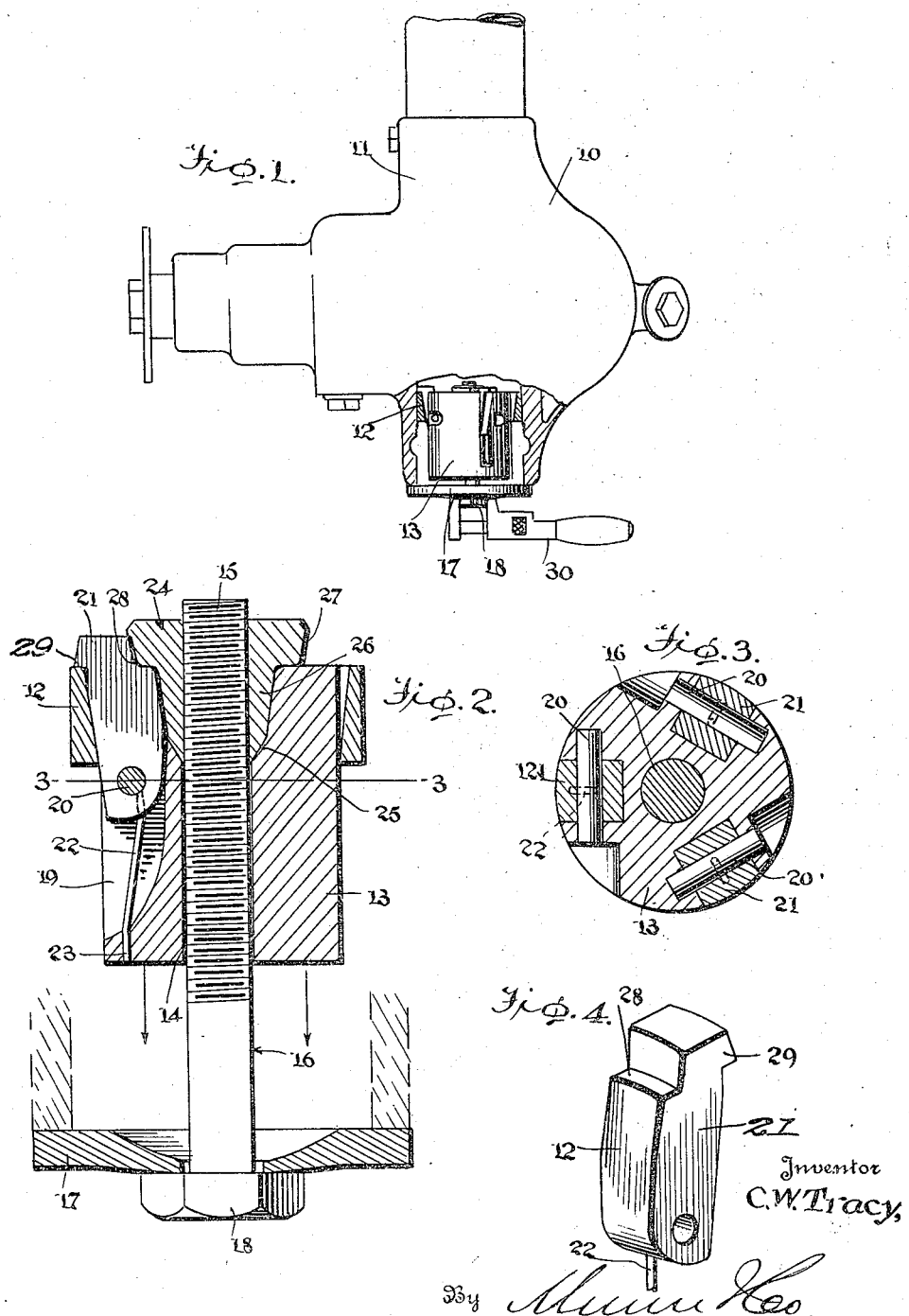
Inventor
C. W. Tracy,
By
Attorney Patented Sept. 4, 1923.

1,466,976

UNITED STATES PATENT OFFICE.

CLYDE W. TRACY, OF VISALIA, CALIFORNIA.

PULLER FOR SLEEVE BEARINGS.

Application filed January 10, 1922. Serial No. 528,158.

*To all whom it may concern:*

Be it known that I, CLYDE W. TRACY, a citizen of the United States, and a resident of Visalia, in the county of Tulare and State of California, have invented certain new and useful Improvements in Pullers for Sleeve Bearings, of which the following is a specification.

This invention relates to a puller for sleeve bearings.

It often occurs that old and worn sleeve bearings must be pulled or removed in order that new ones may be substituted or possibly the old sleeve bearings relined. Usually considerable difficulty is had in removing these sleeve bearings, and with this in view it is the object of the present invention to provide a device whereby sleeve bearings may be removed or pulled in an expeditious manner.

It is also an object of the invention that the device be adapted to in no way mar or injure the sleeve bearing being pulled.

Other objects and objects relating to details of construction, combination and arrangement of parts will hereinafter appear in the detailed description to follow.

The present invention is particularly adapted for use in pulling or removing the so-called "Timkem type" of sleeve bearings and so illustrated in the accompanying drawings, in which:—

Figure 1 is a rear elevation of a differential and illustrating the application of the present invention in removing or pulling a sleeve bearing of the type mentioned, Figure 2 is a vertical longitudinal sectional view of the device and illustrating the same when applied, Figure 3 is a transverse sectional view of the same taken substantially on the line 3—3 of Figure 2, Figure 4 is a perspective view of one of the dogs employed.

Referring to the drawings more particularly, 10 indicates generally a differential housing from which there extends the usual bearing portions 11. In the present instance the adjusting ring has been removed and the sleeve bearing 12 which supports the roller bearings in a manner well known is free to be pulled outwardly through the bearing housing 11.

In carrying out the present invention there is provided a cylindrical block 13 having a smooth central bore 14 adapted to receive the threaded portion 15 of a bolt 16. A large washer 17 is carried by the bolt 16 and adapted to bridge the outer end of the bearing housing 11 and to abut the head 18 of bolt 16.

The cylindrical block 13 has its exterior surface formed with a plurality of recesses 19 preferably three in number which extend from the forward end thereof to a point adjacent its rear end as shown. Transversely of each recess and near a point intermediate the length thereof there extends a pin 20 and by each pin there is pivotally supported a dog 21. The dogs 21 are pivoted near their rear ends, as shown, and each has extending therefrom a spring wire 22 which has its other end embedded in the block 13 as at 23. The spring wires 22 are adapted to urge the forward ends of the dogs 21 inwardly or toward each other.

Upon the outer end of the bolt 16 there is threaded a plug 24, the exterior surface of which consists in a conical portion 25, a tapering portion 26 and an enlarged portion or head 27. The outer end of the bore 14 of the block 13 is enlarged so that the plug 24 may fit therein, and each dog 21 has its lower edge formed with an offset 28 adapted to abut the enlargement or head 27 of the plug 24; likewise the outer edge of each dog 21 has a portion thereof cut away to form a projection 29 to engage the forward edge of the bearing sleeve 12 when said dogs are expanded as best shown in Figure 2.

In the use of the present invention when it is desired to pull a sleeve bearing 12, the adjusting ring is removed and the device inserted within the bearing sleeve, that is, the cylindrical block portion of the device. The bolt 16 is then pulled rearwardly so that the dogs 21 may be expanded for engaging the bearing sleeve 12 as shown in Figures 1 and 2. A wrench indicated by the reference numeral 30 may now be applied to the bolt head 18, and the bolt 18 turned in a direction for moving the plug 24 rearwardly and carry therewith the block 13 whereby the bearing sleeve 12 may be withdrawn from the bearing housing 11.

While I have shown and described the preferred form of my invention it is to be understood that I am aware of the fact that the construction, combination and arrangement of parts may be changed by those skilled in the art without departing from the spirit of my invention, as indicated by the appended claims.

I claim:

1. A device of the character described, comprising a cylindrical block adapted to be disposed within a bearing sleeve, a plurality of dogs pivoted to the inner end of said block and adapted to be expanded for engaging the bearing sleeve and locking the same to the block, a screw bolt extending through said block centrally thereof, a plug threaded upon the inner end of said screw when said screw is turned in the proper direction adapted to engage said dogs for expanding the same, and also adapted to move the block and dogs upon said screw bolt, means for holding said screw bolt against movement in an inward direction whereby with the turning thereof in the proper direction the bearing sleeve may be pulled or removed.

2. A device of the character described, comprising a cylindrical block adapted to be disposed within a bearing sleeve, a plurality of dogs pivoted to the inner end of said block and adapted to be expanded for engaging the bearing sleeve and locking the same to the block, a screw bolt extending through said block centrally thereof, a plug threaded upon the inner end of said screw when said screw is turned in the proper direction adapted to engage said dogs for expanding the same, and also adapted to move the block and dogs upon said screw bolt, a washer plate adapted to be interposed between the head and said screw bolt and housing for said bearing sleeve whereby upon the turning movement of said screw bolt in the proper direction the bearing sleeve may be pulled or removed.

3. A device of the character described, comprising a cylindrical block adapted to be disposed within a bearing sleeve, the exterior surface of said block being formed with a plurality of recesses extending longitudinally thereof, a dog having its one end pivotally supported in each of said recesses, spring means for urging the forward ends of said dogs inwardly and said dogs being adapted when pressed outwardly to engage the bearing sleeve and lock the same to said block, a threaded bolt extending through said cylindrical block, a plug threaded upon the inner end of said bolt and adapted to engage said dogs for pressing the same outwardly when moved toward the head of the bolt, means whereby the said bolt may be held against inward movement whereby with the turning thereof in the proper direction the said bearing may be pulled or removed.

4. A device of the character described comprising a block adapted to be disposed within a bearing sleeve, a plurality of dogs carried by said block adapted to be operated to engage with the bearing sleeve, a screw extending through said block, means for holding the screw against inner longitudinal movement, and means threaded upon the inner end of the screw whereby with the turning of said screw the dogs will be operated for engaging the said sleeve and the block moved outwardly and longitudinally of said screw and thereby to remove said screw from the bearing.

5. A device of the character described, comprising a block adapted to be disposed within a bearing sleeve, a plurality of pivoted dogs carried by said block adapted to be operated for engaging with the bearing sleeve, means for normally holding said dogs out of engagement with said bearing sleeve, means for holding the screw against inner longitudinal movement, and means threaded upon the inner end of said screw adapted upon the turning of said screw in a right hand direction to operate said dogs for engaging the sleeve and to move said block outwardly and longitudinally of the screw and thereby draw said sleeve from its associated bearing.

CLYDE W. TRACY.